Patented Nov. 20, 1945

2,389,144

UNITED STATES PATENT OFFICE 2,389,144

SEPARATION OF HYDROCARBONS

Theodore W. Evans, Oakland, and Rupert C. Morris, Berkeley, Calif., assignors to Shell Development Company, San Francisco, Calif., a corporation of Delaware No Drawing. Application October 19, 1942, Serial No. 462,623

8 Claims. (Cl. 183—115)

This invention relates to the separation of hydrocarbons and more particularly pertains to a practical and economical method for effecting the separation of hydrocarbon mixtures of narrow boiling range containing two or more hydrocarbons of different degrees of saturation, which are difficult to separate by ordinary fractional distillation.

In the treatment, for example, of cracked petroleum distillates it is relatively easy by ordinary fractional distillation to obtain fractions which predominate in hydrocarbons of both saturated and unsaturated character containing the same number of carbon atoms. However, separation of these fractions into their components by simple distillation, while theoretically possible, presents almost insurmountable practical difficulties. This is due, of course, to the very slight difference existing between the boiling points of the components of such mixtures.

Various methods have been proposed for effecting the separation or purification of hydrocarbon mixtures containing components of different degrees of saturation which are difficult to separate by ordinary fractionation. Of these methods the most practical from the standpoint of large-scale operation are those which involve contacting the mixture with a solvent, which has a preferential solubility for one or more of the components thereof. Such processes may be carried out in various ways, the most common mode comprising the use of a spray, pack, or bubble plate tower, wherein the mixture is scrubbed by a stream of selective solvent flowing therethrough, usually in countercurrent relation to the mixture under treatment. Improved results are attained in many cases by distilling the mixture in the presence of the solvent. This method is commonly referred to as extractive distillation. While susceptible to some variation, processes of this latter type are, in general, executed by causing the solvent to flow down the distillation column, as the distillation proceeds and as vapors ascend from the kettle at the bottom of the column. Thus the solvent scrubs the vapors in a first zone, selectively dissolving the more soluble component and the resulting fat solvent is partially stripped in a second zone by vapor fresh from the distillation kettle, having a higher temperature than the vapor in the first zone. The dissolved component may be removed from the fat solvent by distillation, reduction of pressure, or by any other suitable means to produce a lean solvent which may be recirculated.

Extractive distillation processes are often executed in a continuous manner, the mixture to be separated being continuously introduced into the column at a point below the solvent feed. Frequently, in continuous operation, it is the practice in lieu of heating the solution of the extracted component at the base of the column to supply the vapor to partially strip the descending fat solvent, to divert a portion of the overhead vapor produced during regeneration of the solvent to the base of the distillation column. Under this method of operation it is not essential that the distillation column be provided with a heat source. A "top reflux" is also usually provided, part of the overhead product of the distillation column being condensed and returned thereto at a point above the solvent feed. Intervening plates between the top reflux and solvent inlet ports are advisable when operating with a top reflux.

An object of the present invention is to provide solvents adapted for use in the extraction of processes of the hereinabove described type, which solvents have a greater selectivity for dienes as contained in mixtures with mono-olefins than solvents previously disclosed and which may be applied also to the separation of dienes and/or mono-olefins from paraffins.

A class of solvents, which has been found to answer to the above objects, consists of acid anhydrides, esters of keto alcohols, and certain other compounds containing a plurality of carbonyl groups.

Among the many compounds suitable for use in the execution of the invention may be mentioned: the simple or mixed anhydrides such as, acetic anhydride, propionic anhydride, butyric anhydride, butyric-acetic anhydride, the anhydride of acetic and propionic acids, n-valeric anhydride, isovaleric anhydride, acetic-isovaleric anhydride; esters of keto alcohols, as the formates, acetates, etc. of hydroxy acetone, diacetone alcohol, and the like; esters of keto acids such as, methyl aceto-acetate, ethyl aceto-acetate, methyl levulinate, ethyl levulinate.

While the foregoing solvents are of general application, it is to be understood that they may not be equally efficacious in a given separation problem. It is preferred to operate with a solvent in which the volatility ratio of the components of the mixture to be separated is most favorable to their separation. Relative volatility is defined for a simple two component system in the presence of a higher boiling selective solvent as follows:

$$\alpha = \frac{P_1}{X_1} \Big/ \frac{P_2}{X_2}$$

wherein $\alpha$ = relative volatility
$P_1$ = partial pressure of first component
$P_2$ = partial pressure of second component
$X_1$ = mol fraction of the first component in the total liquid including the selective solvent.
$X_2$ = mol fraction of the second component in the total liquid including the selective solvent.

The solubility ratio in the proposed solvent of the components to be separated is also a good indication of the efficacy of the solvent. This is easily determined by bubbling a measured quantity of each hydrocarbon present in the mixture to be separated through the proposed solvent and analyzing the unabsorbed vapors.

The mixture to be separated may be introduced into contact with the solvent either as a vapor or as a liquid. The amount or ratio of solvent should be at least sufficient to dissolve a major portion of the constituent to be extracted. In some cases a considerable excess over this amount may be used, especially where it is desired to remove the last traces of the more soluble constituent of the mixture. The most economical amount varies with the nature of the solvent involved, the temperatures and pressures employed, and the particular mixture to be extracted.

When the hydrocarbon mixture is not distilled in the presence of the solvent but is merely passed into contact therewith, which procedure may be referred to as ordinary extraction in order to distinguish from extractive distillation, the most suitable operating temperature varies with the pressure maintained during the extraction and is usually a compromise. This follows from the fact that both solubility and selectivity are necessary. At low temperatures, for a fixed pressure, the solubility may be so great as to allow for no selectivity, while at high temperatures (approaching the boiling point of the solvent at the existing pressure) so little material can dissolve that the operation again is not an economical one no matter how high the selectivity may become. Usually it is preferred to operate at a temperature substantially below the boiling point of the solvent but slightly above the condensation temperature of the most readily condensible constituent of the mixture at the existing pressure, the mixture being introduced into contact with the solvent as a vapor.

When the hydrocarbon mixture is distilled in the presence of the solvent, it is in general preferred to operate at a superatmospheric pressure, particularly when the mixture is made up of normally gaseous components, because this does away with the necessity of refrigerating the still head as with ammonia or sulfur dioxide. However, in certain cases as where the spread between the effective distillation temperatures of the components to be separated in the presence of the solvent is greatest at subatmospheric pressures, it may be advantageous to operate at a reduced pressure despite the additional expense occasioned by the use of a refrigerant. In an extractive distillation as in ordinary distillation the reflux rate or rates depends upon various factors including the degree of separation required, the size and number of plates in the available column, etc. Plate requirements to achieve a given throughput may be conveniently estimated according to the graphical method of McCabe and Thiele.

The present process is especially valuable in the separation of narrow boiling mixtures predominating in hydrocarbons of four carbon atoms, but is also applicable with good results to the separation of ethylene from ethane, propylene from propane, pentadienes from amylenes, pentadienes and/or amylenes from iso and/or n-pentane, etc.

The accompanying table, which gives the solubilities of butadiene and butylene at 20° C. and at one atmosphere pressure in several of the solvents listed above, is submitted in illustration of the suitability of the solvents of the invention in the separation of hydrocarbons of four carbon atoms having different degrees of saturation. Presentation of this table is not to be considered as limiting the invention to the particular solvents covered thereby.

| Compound | Cc. gas dissolved in 10 cc. solvent at 20 deg. C. and atmospheric pressure | | Solubility ratio | Formula | B. P. solvent deg. C. |
|---|---|---|---|---|---|
| | Butadiene | Butylene | | | |
| Acetonyl acetone | 741 | 441 | 1.65 | $CH_3-\overset{O}{\underset{\|}{C}}-CH_2-CH_2-\overset{O}{\underset{\|}{C}}-CH_3$ | 194 |
| Acetic anhydride | 661 | 398 | 1.66 | $CH_3-\overset{O}{\underset{\|}{C}}-O-\overset{O}{\underset{\|}{C}}-CH_3$ | 139.6 |
| Methyl acetoacetate | 707 | 402 | 1.75 | $CH_3-\overset{O}{\underset{\|}{C}}-CH_2-\overset{O}{\underset{\|}{C}}-OCH_3$ | 170 |
| Ethyl acetoacetate | 713 | 438 | 1.63 | $CH_3-\overset{O}{\underset{\|}{C}}-CH_2-\overset{O}{\underset{\|}{C}}-OC_2H_5$ | 180 |
| Methyl levulinate | 637 | 434 | 1.46 | $CH_3-\overset{O}{\underset{\|}{C}}-CH_2-CH_2-\overset{O}{\underset{\|}{C}}-OCH_3$ | |
| Diethyl oxalate | 739.3 | 543 | 1.36 | $C_2H_5-O-\overset{O}{\underset{\|}{C}}-\overset{O}{\underset{\|}{C}}-OC_2H_5$ | 186.1 |

One method of utilizing the solvents provided by the invention is disclosed by the following example which is not to be taken as restricting the invention to the separation of the particular mixture treated.

*Example*

The apparatus used comprised a jacketed glass column containing 40 actual plates. The mixture separated which consisted of about 40% butadiene and about 60% butylenes was introduced as a vapor on to the 20th plate from the bottom. Acetic anhydride was used as the selective solvent, solvent feed being to the top plate. The least soluble gas, the butylenes, were removed from the top of the column. About 250 cc. of the hydrocarbon mixture was fed to the column per minute while the solvent feed rate was about 22 cc. a minute. Column temperature was maintained substantially constant at about 20° C. with ordinary cooling water. The overhead gas, which analyzed less than 3% butadiene, was removed at the rate of about 150 cc. a minute. None of the overhead was returned to the column as reflux. However, a bottom reflux was provided, roughly a liter of butadiene being introduced each minute near the bottom of the column during the extraction. This reflux material analyzed about 98% pure. The ratio of reflux butadiene to the butadiene content of the feed mixture was approximately 11:1. The fat solvent from the bottom of the extraction column was degassed by heating it to its boiling point. The butadiene product analyzed over 98% pure.

We claim as our invention:

1. A process for the separation of butadiene from butylenes which comprises contacting a gaseous mixture of butadiene and a butylene with liquid acetic anhydride to selectively dissolve the butadiene, separating the residual gas from the liquid solution containing the butadiene, and heating the solution to recover butadiene therefrom.

2. A process for the separation of butadiene from butylenes which comprises contacting a gaseous mixture of butadiene and a butylene with a normally liquid anhydride of a saturated aliphatic carboxylic acid to selectively dissolve the butadiene, separating the residual gas from the liquid solution containing the butadiene, and heating the solution to recover butadiene therefrom.

3. A process for the separation of a diolefin from a hydrocarbon mixture containing a diolefin and a mono-olefin having the same number of carbon atoms per molecule as said diolefin which comprises contacting said mixture with a normally liquid anhydride of a saturated aliphatic carboxylic acid to selectively dissolve the diolefin, separating the undissolved portion of the mixture from the liquid solution containing the diolefin and recovering the diolefin from said last-mentioned liquid solution.

4. A process for the separation of a diolefin from a hydrocarbon mixture containing a diolefin and a hydrocarbon which has the same number of carbon atoms per molecule but which is more saturated than said diolefin, which comprises contacting said mixture with a normally liquid anhydride of a saturated aliphatic carboxylic acid to selectively dissolve the diolefin, separating the undissolved portion of the mixture from the liquid solution containing the diolefin, and recovering the diolefin from said last-mentioned liquid solution.

5. In a process for the separation of an olefinic hydrocarbon from a hydrocarbon mixture containing it and a more saturated hydrocarbon having the same number of carbon atoms per molecule as said olefinic hydrocarbon, the steps of contacting said mixture with a normally liquid anhydride of a saturated aliphatic carboxylic acid, and separating the undissolved portion of the mixture from the liquid solution containing said first-mentioned olefinic hydrocarbon.

6. A process for the separation of pentadienes from more saturated hydrocarbons containing five carbon atoms to the molecule which comprises contacting a gaseous mixture containing pentadienes and a more saturated hydrocarbon containing five carbon atoms with liquid acetic anhydride to selectively dissolve the pentadienes, separating the undissolved portion of the mixture from the liquid solution containing the pentadienes, and recovering the pentadienes from said last-mentioned liquid solution.

7. A process for the separation of pentadienes from more saturated hydrocarbons containing five carbon atoms to the molecule which comprises contacting a gaseous mixture containing pentadienes, pentenes and pentanes with liquid acetic anhydride to selectively dissolve the pentadienes, separating the undissolved portion of the mixture from the liquid solution containing the pentadienes, and recovering the pentadienes from said last-mentioned solution.

8. A process for the separation of pentadienes from more saturated hydrocarbons containing five carbon atoms to the molecule which comprises contacting a gaseous mixture containing pentadienes and a more saturated hydrocarbon containing five carbon atoms with a normally liquid anhydride of a saturated aliphatic carboxylic acid, separating the undissolved portion of the mixture from the liquid solution containing the pentadienes, and recovering the pentadienes from said last-mentioned liquid solution.

THEODORE W. EVANS.
RUPERT C. MORRIS.